(12) United States Patent
Kim et al.

(10) Patent No.: US 10,757,681 B2
(45) Date of Patent: Aug. 25, 2020

(54) METHOD FOR PERFORMING PAGING-RELATED OPERATION OF SECOND UE HAVING CONNECTION WITH FIRST UE IN WIRELESS COMMUNICATION SYSTEM, AND APPARATUS THEREFOR

(71) Applicant: LG ELECTRONICS INC., Seoul (KR)

(72) Inventors: Laeyoung Kim, Seoul (KR); Jaehyun Kim, Seoul (KR); Taehun Kim, Seoul (KR); Jaewook Lee, Seoul (KR); Sungduck Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/484,097

(22) PCT Filed: Feb. 6, 2018

(86) PCT No.: PCT/KR2018/001536
§ 371 (c)(1),
(2) Date: Aug. 6, 2019

(87) PCT Pub. No.: WO2018/143758
PCT Pub. Date: Aug. 9, 2018

(65) Prior Publication Data
US 2020/0008173 A1    Jan. 2, 2020

Related U.S. Application Data

(60) Provisional application No. 62/454,920, filed on Feb. 6, 2017.

(51) Int. Cl.
*H04W 24/08* (2009.01)
*H04W 68/08* (2009.01)
(Continued)

(52) U.S. Cl.
CPC ........... *H04W 68/08* (2013.01); *H04W 68/02* (2013.01); *H04W 76/10* (2018.02); *H04W 76/27* (2018.02); *H04W 88/08* (2013.01); *H04W 92/10* (2013.01)

(58) Field of Classification Search
CPC . H04W 36/32; H04W 36/18; H04W 36/0011; H04W 36/28; H04W 8/14; H04W 36/08; H04W 76/32; H04W 88/16
(Continued)

(56) References Cited

U.S. PATENT DOCUMENTS

2011/0258327 A1* 10/2011 Phan ..................... H04W 76/14
709/227
2015/0358954 A1   12/2015 Koshimizu et al.
(Continued)

FOREIGN PATENT DOCUMENTS

KR    1020120099665    9/2012
WO    2014171786    10/2014

OTHER PUBLICATIONS

PCT International Application No. PCT/KR2018/001536, Written Opinion of the International Searching Authority dated Jun. 4, 2018, 16 pages.

*Primary Examiner* — Phuoc H Doan
(74) *Attorney, Agent, or Firm* — Lee, Hong, Degerman, Kang & Waimey

(57) ABSTRACT

One embodiment of the present invention provides a method for performing a paging-related operation by a base station of a second user equipment (UE) having connection with a first UE in a wireless communication system, the method comprising the steps of: receiving a paging message for the second UE from a second MME by the base station; and when the second UE is in a radio resource control (RRC)-connected state while being in a core network (CN)-idle state, transmitting a message, including information related (Continued)

to a connection state of the second UE, as a response to the paging message to the second MME by the base station.

14 Claims, 16 Drawing Sheets

(51) Int. Cl.
    *H04W 76/27*     (2018.01)
    *H04W 76/10*     (2018.01)
    *H04W 68/02*     (2009.01)
    *H04W 88/08*     (2009.01)
    *H04W 92/10*     (2009.01)

(58) Field of Classification Search
    USPC ............... 370/252, 345; 455/414.1; 709/227; 707/758
    See application file for complete search history.

(56) References Cited

U.S. PATENT DOCUMENTS

| | | |
|---|---|---|
| 2016/0212780 A1 | 7/2016 | Stojanovski |
| 2016/0337954 A1 | 11/2016 | Gulati et al. |
| 2018/0368042 A1* | 12/2018 | Jin ....................... H04W 76/32 |

\* cited by examiner

Scenario 1 : OOC and connected to relay

Scenario 2 : OOC and no connected to relay

Scenario 3 : In coverage and no connection to relay

Scenario 4 : In coverage and connected to relay

METHOD FOR PERFORMING
PAGING-RELATED OPERATION OF
SECOND UE HAVING CONNECTION WITH
FIRST UE IN WIRELESS COMMUNICATION
SYSTEM, AND APPARATUS THEREFOR

CROSS-REFERENCE TO RELATED
APPLICATIONS

This application is the National Stage filing under 35 U.S.C. 371 of International Application No. PCT/KR2018/001536, filed on Feb. 6, 2018, which claims the benefit of U.S. Provisional Application No. 62/454,920, filed on Feb. 6, 2017, the contents of which are all hereby incorporated by reference herein in their entireties.

TECHNICAL FIELD

The present disclosure relates to a wireless communication system, and more particularly, to a method and apparatus for processing paging of a relay user equipment (UE) having a connection to a remote UE.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

DISCLOSURE

Technical Problem

An aspect of the present disclosure is to provide a method of successfully transmitting downlink traffic to a relay user equipment (UE) which has transitioned to RRC connected mode due to a network connection request from a remote UE by managing a connection of the relay UE in a mobile communication system such as a 3' generation partnership project (3GPP) global system for mobile communication (GSM), universal mobile telecommunication system (UMTS), evolved packet system (EPS), or $5^{th}$ generation (5G) system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an embodiment of the present disclosure, a method of performing a paging-related operation by a base station of a second user equipment (UE) having a connection to a first UE in a wireless communication system includes receiving a paging message for the second UE from a second mobility management entity (MME) by the base station, and when the second UE is in both of a core network (CN) idle state and a radio resource control (RRC) connected state, transmitting, to the second MME, a message including information related to a connection state of the second UE in response to the paging message by the base station.

According to an embodiment of the present disclosure, a base station for performing an operation related to paging of a second UE having a connection to a first UE in a wireless communication system includes a transceiver and a processor. The processor is configured to: receive a paging message for the second UE from a second mobility management entity (MME); and when the second UE is in both of a core network (CN) idle state and a radio resource control (RRC) connected state, transmit, to the second MME, a message including information related to a connection state of the second UE in response to the paging message.

The RRC connected state may be a state to which the second UE has transitioned in response to reception of a network connection request from the first UE.

The information related to the connection state of the second UE may include information indicating that the base station is serving the second UE or information indicating that the second UE is in the RRC connected state.

The message including the information related to the connection state of the second UE may be a paging response message.

Upon receipt of the message including the information related to the connection state of the second UE, the second MME may establish a user plane for the second UE.

When the second UE is in both of the CN idle state and an RRC idle state, the base station may transmit a paging message for the second UE.

The first UE may be a remote UE, and the second UE may be a relay UE.

Advantageous Effects

According to the present disclosure, the conventional problem of failure of traffic transmission to a relay user equipment (UE) which has transitioned to an RRC connected state for a remote UE may be overcome.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the present disclosure and are incorporated in and constitute a part of this application, illustrate embodiments of the present disclosure and together with the description serve to explain the principle of the disclosure. In the drawings.

BEST MODE FOR CARRYING OUT THE INVENTION

Figure 1:
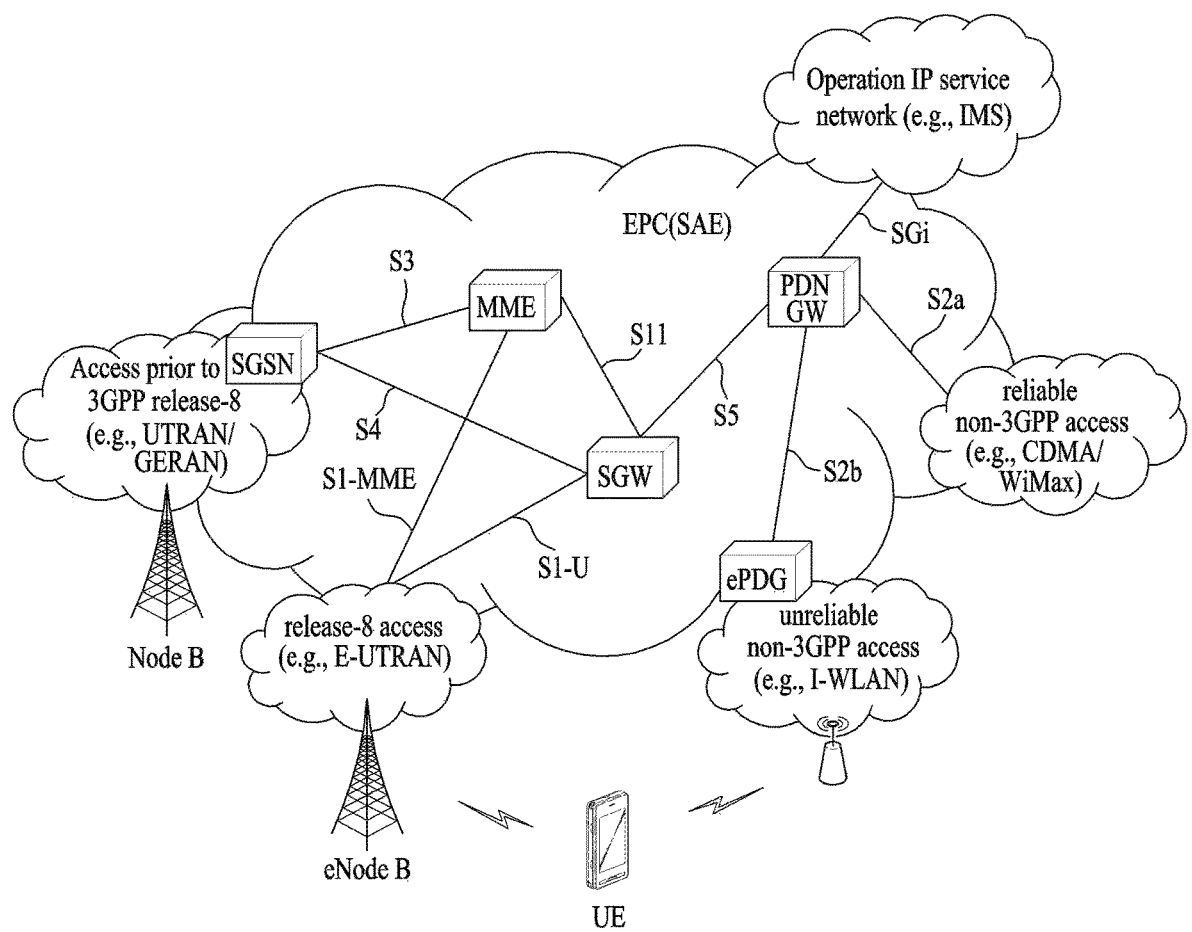
FIG. 1 is a schematic diagram illustrating the structure of an evolved packet system (EPS) including an evolved packet core (EPC)

The embodiments below are combinations of components and features of the present disclosure in a prescribed form. Each component or feature may be considered as selective unless explicitly mentioned as otherwise. Each component or feature may be executed in a form that is not combined with other components and features. Further, some components and/or features may be combined to configure an embodiment of the present disclosure. The order of operations described in the embodiments of the present disclosure may be changed. Some components or features of an embodiment may be included in another embodiment or may be substituted with a corresponding component or feature of the present disclosure.

Specific terms used in the description below are provided to help an understanding of the present disclosure, and the use of such specific terms may be changed to another form within the scope of the technical concept of the present disclosure.

In some cases, in order to avoid obscurity of the concept of the present disclosure, a known structure and apparatus may be omitted, or a block diagram centering on core functions of each structure or apparatus may be used. Moreover, the same reference numerals are used for the same components throughout the present specification.

The embodiments of the present disclosure may be supported by standard documents disclosed with respect to at least one of IEEE (Institute of Electrical and Electronics Engineers) 802 group system, 3GPP system, 3GPP LTE & LTE-A system and 3GPP2 system. Namely, the steps or portions having not been described in order to clarify the technical concept of the present disclosure in the embodiments of the present disclosure may be supported by the above documents. Furthermore, all terms disclosed in the present document may be described according to the above standard documents.

The technology below may be used for various wireless communication systems. For clarity, the description below centers on 3GPP LTE and 3GPP LTE-A, to which the technical idea of the present disclosure is not limited.

Terms used in the present document are defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data is exchanged through a direct data path without passing through a 3GPP core network (e.g., EPC).

EPC (Evolved Packet Core)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, in 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

SGW (or S-GW) operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW (or P-GW) corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also based on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
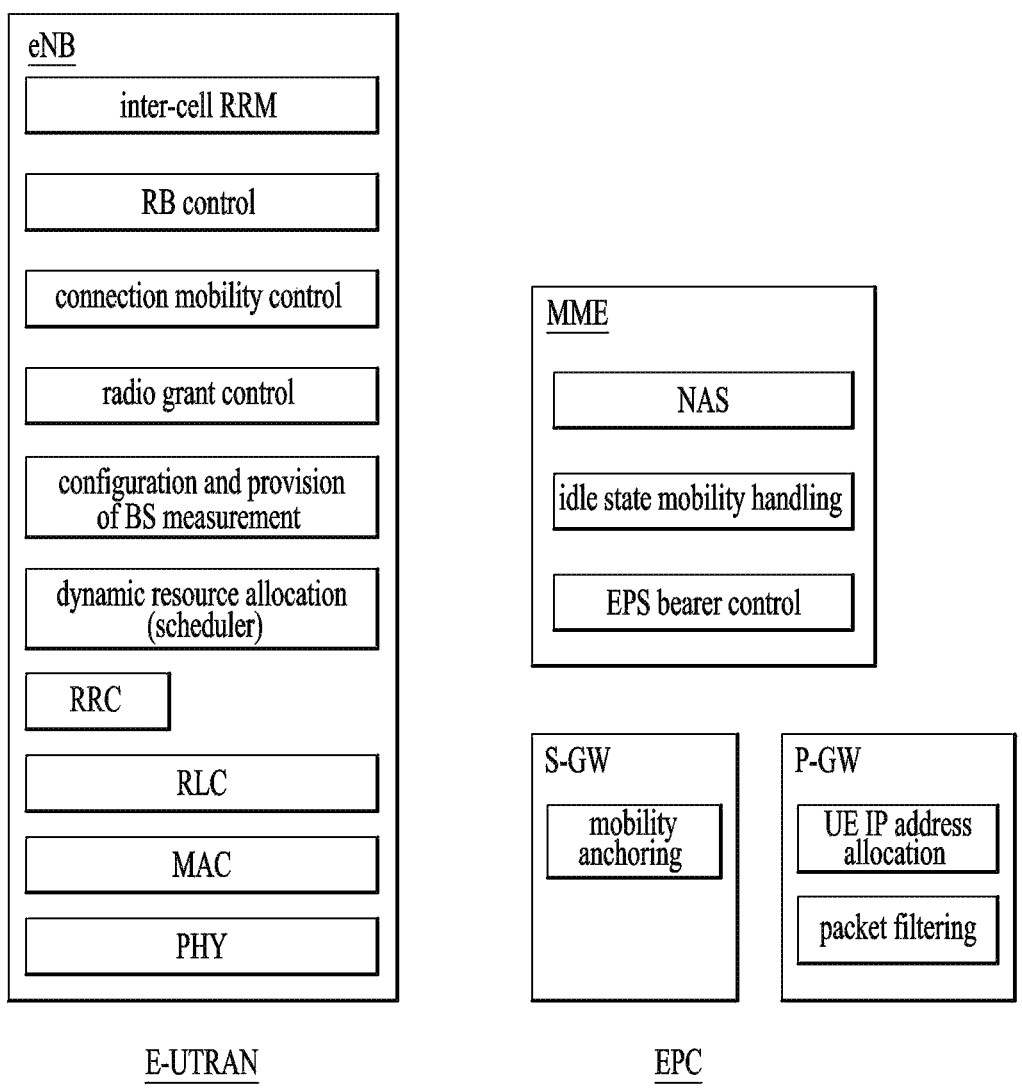
FIG. 2 is a diagram illustrating the general architectures of an evolved UMTS terrestrial radio access network (E-UTRAN) and an EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
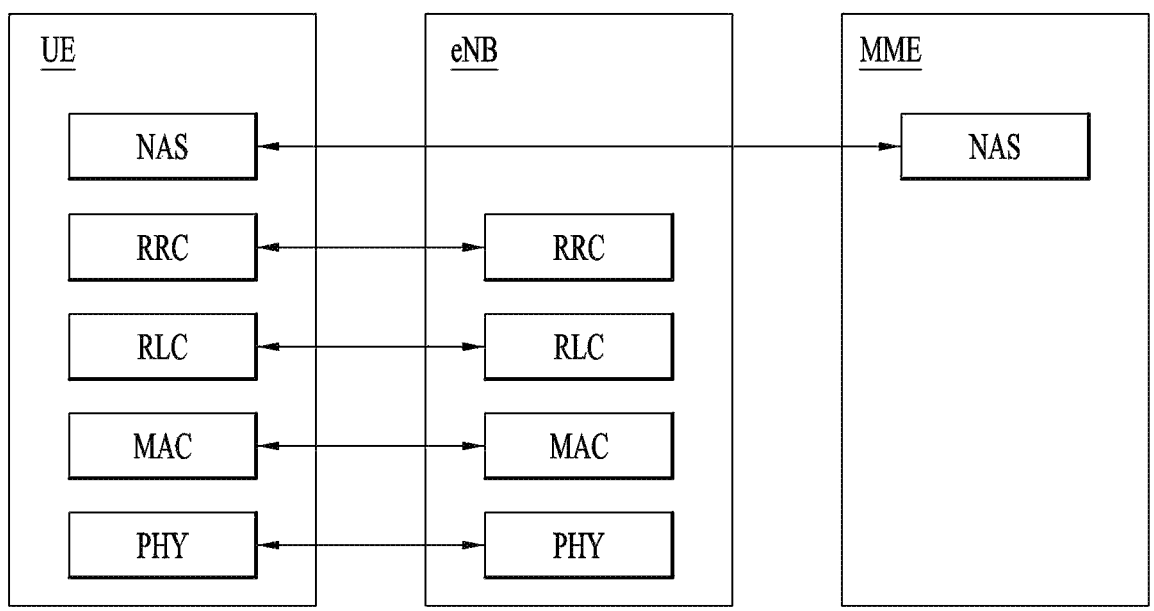
FIG. 3 is a diagram illustrating the structure of a radio interface protocol in a control plane.
Figure 4:
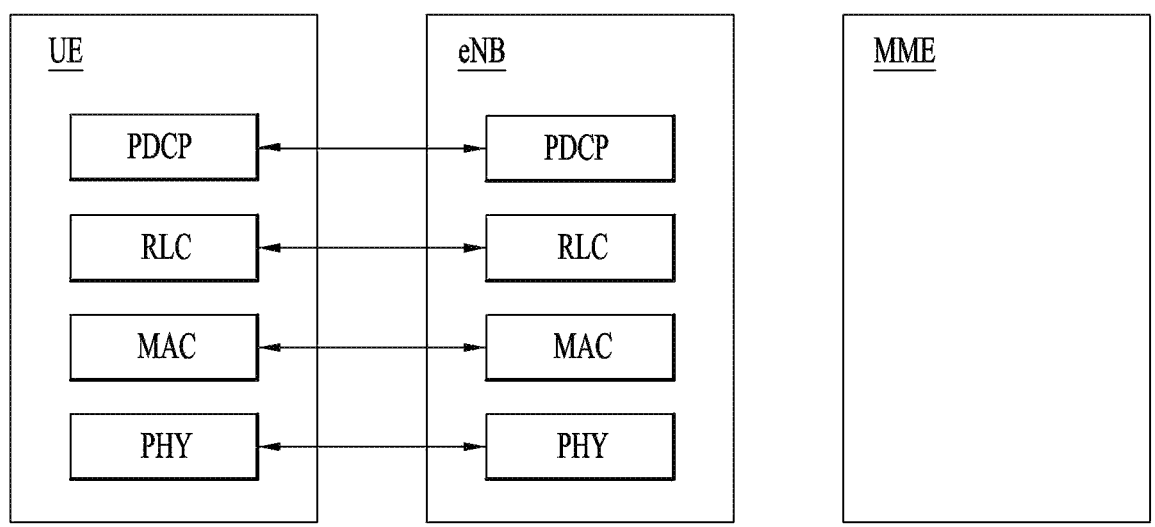
FIG. 4 is a diagram illustrating the structure of a radio interface protocol in a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
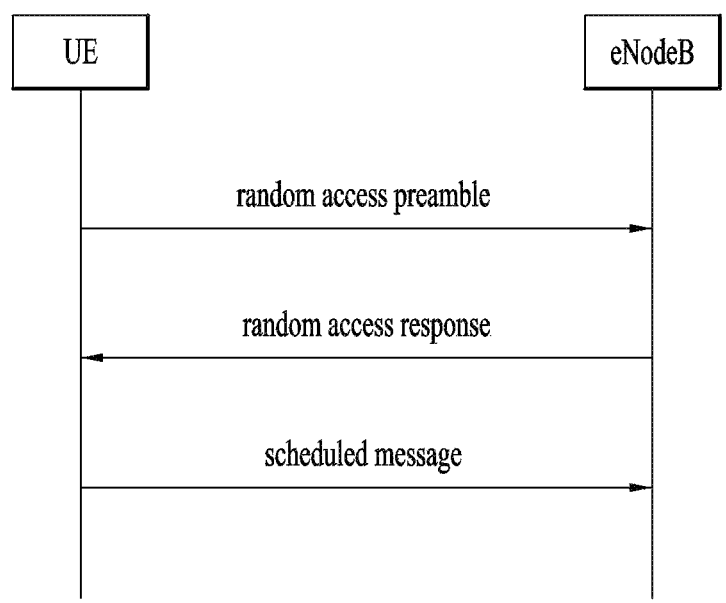
FIG. 5 is a flowchart illustrating a random access procedure.

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
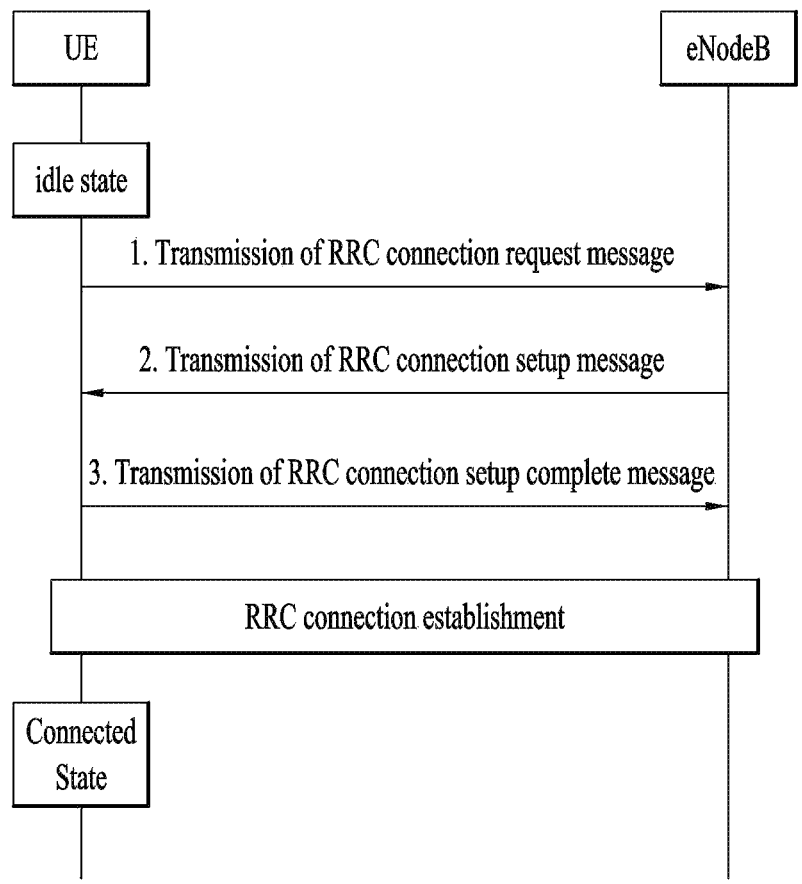
FIG. 6 is a diagram illustrating a connection process in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNode B and transition to the RRC connected mode.

Figure 7:
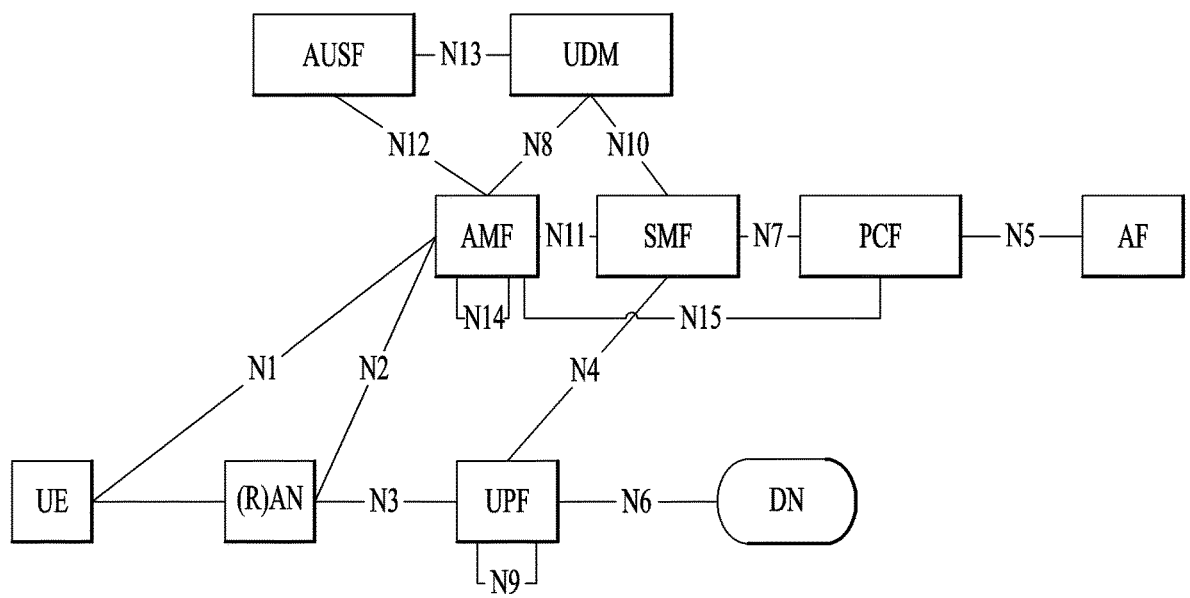
FIG. 7 is a diagram illustrating a 5th generation (5G) system.

The functionality of the MME in the legacy EPC is decomposed into the core access and mobility management function (AMF) and the session management function (SMF) in the next generation system (or 5G core network (CN)). The AMF carries out NAS interaction and mobility management (MM), whereas the SMF carries out session management (SM). The SMF also manages a gateway, user plane function (UPF), which has the user-plane functionality, that is, routes user traffic. It may be considered that the SMF and the UPF implement the control-plane part and user-plane part of the S-GW and the P-GW of the legacy EPC, respectively. To route user traffic, one or more UPFs may exist between a RAN and a data network (DN). That is, for 5G implementation, the legacy EPC may be configured as illustrated in FIG. 7. In the 5G system, a protocol data unit (PDU) session has been defined as a counterpart to a PDN connection of the legacy EPS. A PDU session refers to association between a UE and a DN, which provides a PDU connectivity service of an Ethernet type or an unstructured type as well as an IP type. The unified data management (UDM) performs the same functionality as the HSS of the EPC, and the policy control function (PCF) performs the same functionality as the PCRF of the EPC. Obviously, the functionalities may be extended to satisfy the requirements of the 5G system. For details of the 5G system architecture, each function, and each interface, TS 23.501 is conformed to.

In 3GPP Release 14, SA1 worked on service requirements to allow even a non-public safety UE to receive a network connection service via a relay UE. Wearable devices are mainly under discussion as UEs that receive the network connection device via a relay UE. The following table presents the objective of WID (remote UE access via relay UE (REAR)) for the work on service requirements (see SP-160511). The objective of this work item is to specify service requirements needed to support the connection of a UE with UICC with a network via an evolved ProSe UE-to-network relay. It is assumed that the evolved ProSe UE-to-network relay uses the E-UTRAN to connect to the EPC. In this regard, the contents of Table 2 are considered.

TABLE 2

The communication between the Evolved ProSe Remote UE and the Evolved ProSe UE-to-Network Relay to use either E-UTRA or WLAN.
The 3GPP system to support a user traffic session of an Evolved ProSe Remote UE to be relayed to the network via an Evolved ProSe UE-to-Network Relay. Note: The Evolved ProSe Remote UE has the functionality to directly connect to the EPC without a relay.
Security related requirements for communication from the Evolved ProSe Remote UE to the EPC.
Evaluate what 3GPP services that the 3GPP system will be able to support on an Evolved ProSe Remote UE connecting through an Evolved ProSe UE-to-Network Relay including e.g. emergency calls. In addition, it is also needed to consider if the 3GPP system need to support service continuity or fallback (e.g. CS Fallback) for those services.
Service requirements regarding different ownership and different HPLMNs of the Evolved ProSe Remote UE and Evolved ProSe UE-to-Network Relay.
Basic service requirements regarding charging aspects for respective MNO subscriptions.
What roaming scenarios that the 3GPP system will support regarding roaming of an Evolved ProSe Remote UE and connecting though an available Evolved ProSe UE-to-Network Relay in the visited network or a roaming relay UE.
Service requirements regarding UE consent and/or MNO control of an Evolved ProSe Remote UE connecting through an Evolved ProSe UE-to-Network Relay.
Service requirements on QoS for the services provided to an Evolved ProSe Remote UE connected via a Evolved ProSe UE-to-Network Relay.
Service requirements regarding PLMN selection.
Lower power consumption and lower complexity aspects for the Evolved ProSe Remote UE.
Evaluate the enhancements anticipated from this WID and investigate evolving ProSe Ra 12 and Rel 13 concepts for ProSe UE-to-Network Relay to use Evolved ProSe UE-to-Network Relay.
Consideration of co-existence with ProSe Rel 12 and Rel 13 services and users including shared radio spectrum cases.
Consideration of efficient use of LTE radio spectrum TABLE 2-continued (especially when shared between in-coverage and out-coverage Evolved ProSe Remote UEs).
Support QoS concepts (according to TS23.203 and TS23.401) to allow to prioritization of high priority users and services both in-coverage of cell and out-of-coverage ProSe users and UEs served by Evolved ProSe-UE-to-Network Relays.

Figure 8:
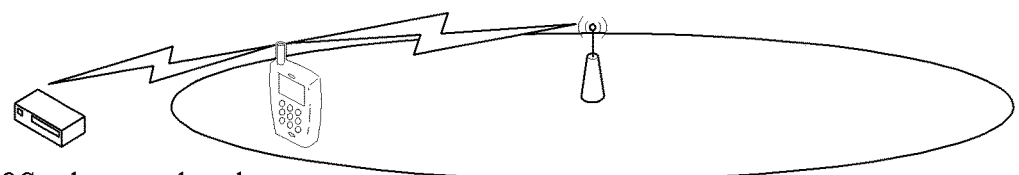
FIG. 8 is a diagram illustrating various scenarios for a relay.
Figure 8:
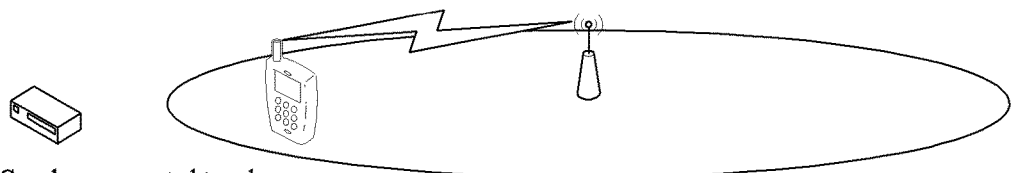
Figure 8:
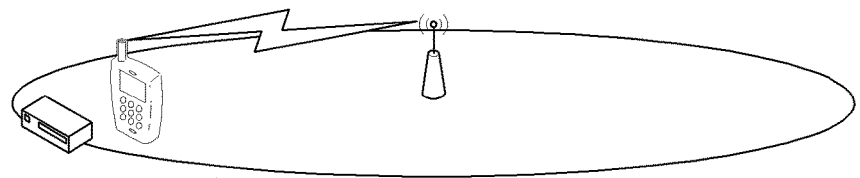
Figure 8:
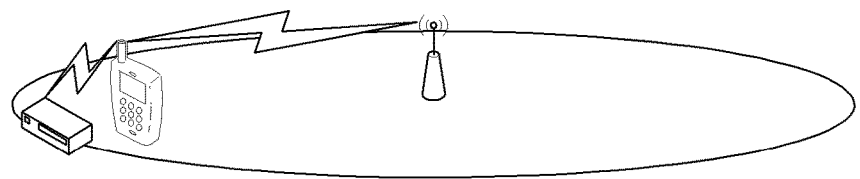

In TS 22.278, clause 7B (Indirect 3GPP Communication) and clause 7C (Requirements for relay UE selection for Evolved ProSe remote UE access via an Evolved ProSe UE-to-Network Relay) describe service requirements for REAR. Further, a solution to satisfy the REAR service requirements is under development in TR 36.746. Particularly, clause 4.3 describes various scenarios as illustrated in FIG. 8.

Figure 9:
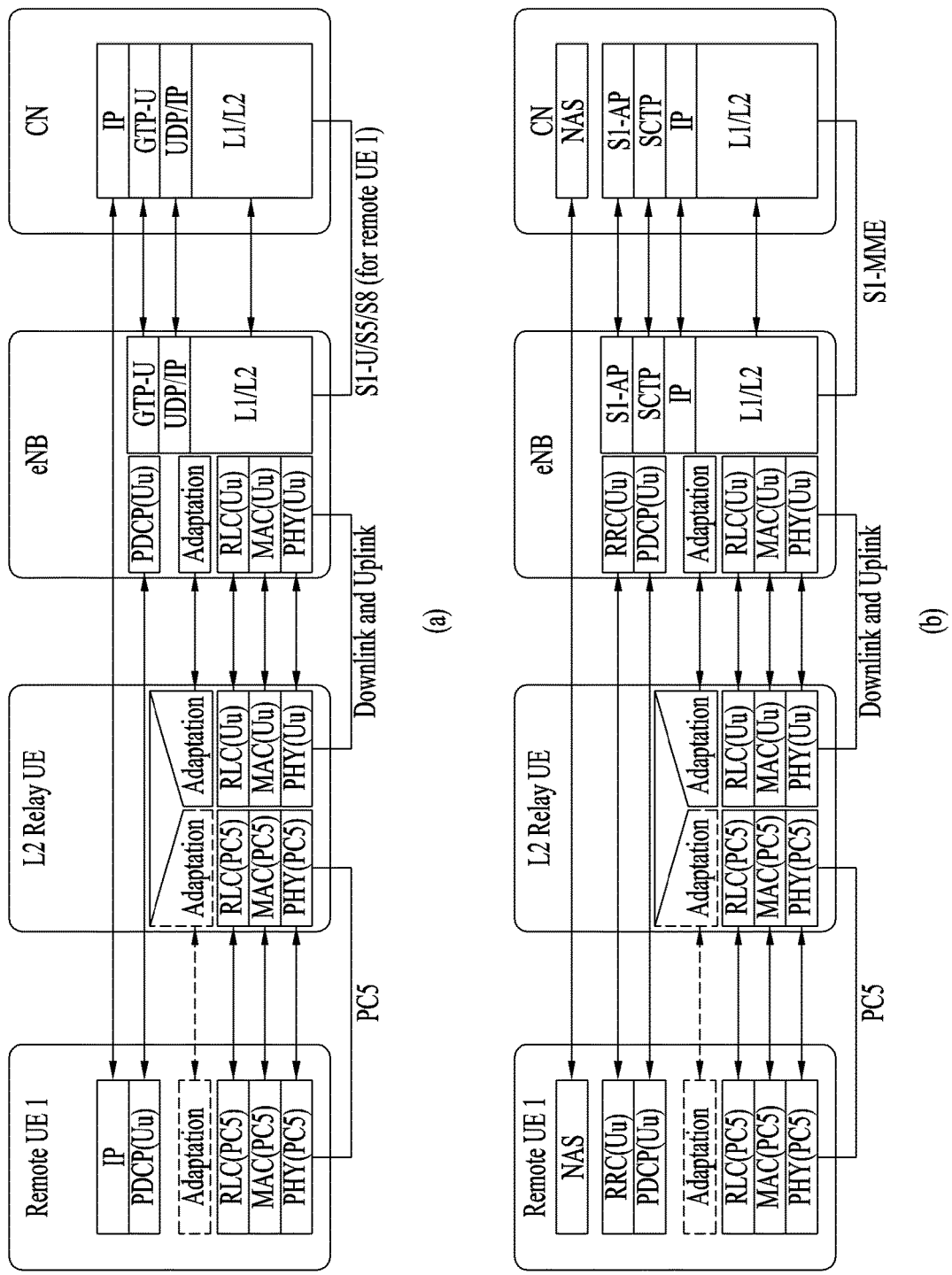
FIGS. 9 and 10 are diagrams illustrating a user-plane protocol stack and a control-plane protocol stack.
Figure 10:
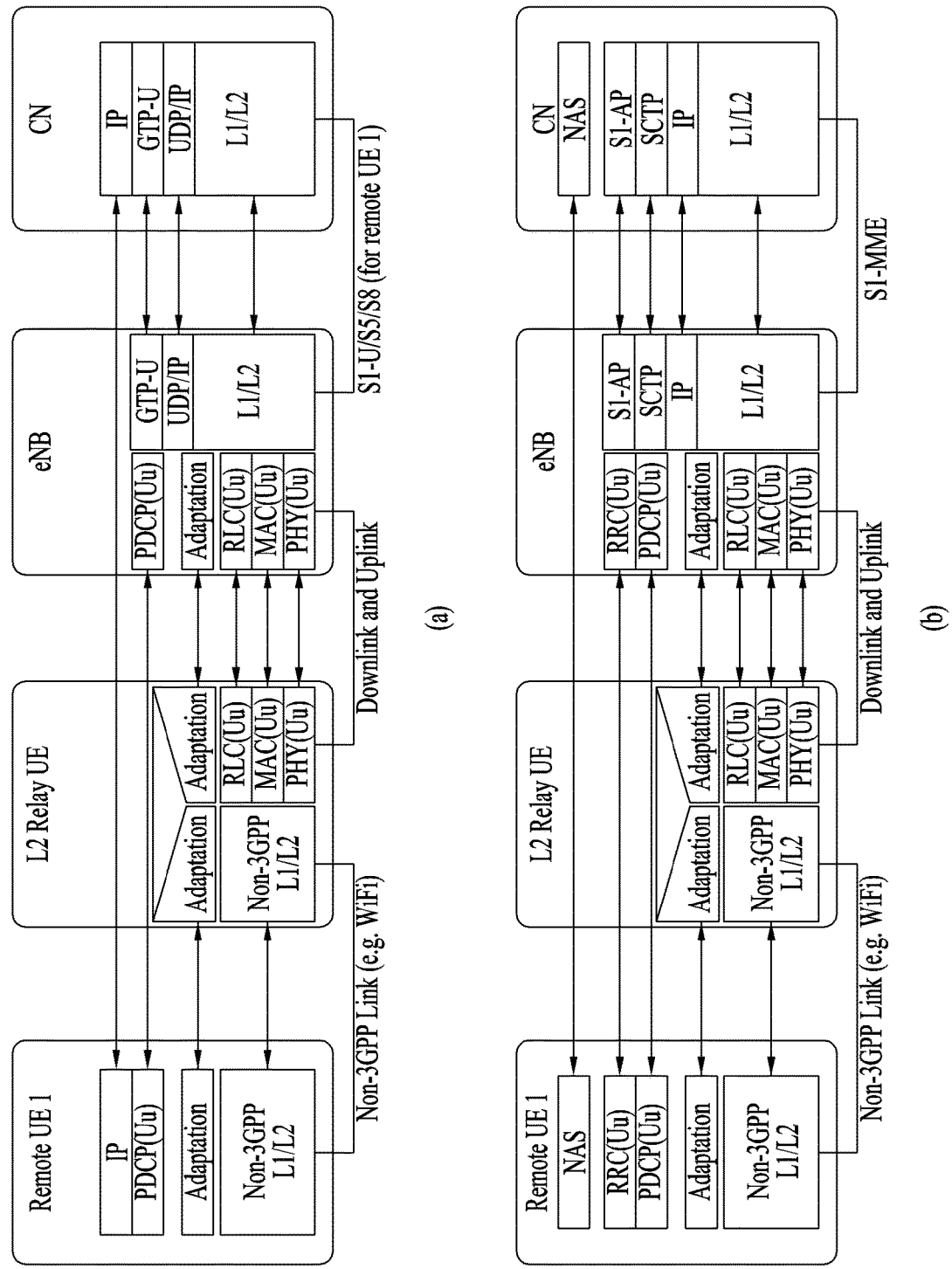

According to 3GPP R2-169155, the control plane (CP) stack and user plane (UP) stack of a relay UE and a remote UE are defined as follows. For the protocol architecture for the UP and CP, relaying is performed above the RLC sublayer. UP and CP data of an evolved ProSe Remote UE are relayed above the RLC sublayer via an evolved ProSe UE-to-network relay UE from an evolved ProSe remote UE to a network and vice versa. Uu PDCP and RRC are terminated between the evolved ProSe remote UE and an eNB while RLC, MAC and PHY and the non-3GPP transport layers are terminated in each link (i.e. the link between the evolved ProSe remote UE and the evolved ProSe UE-to-network relay UE and the link between the evolved ProSe UE-to-network relay UE and the eNB). The UP protocol stack and the CP protocol stack when PC5 is used between the evolved ProSe remote UE and the evolved ProSe UE-to-network relay UE are illustrated in FIGS. 9(a) and 9(b), respectively. The UP protocol stack and the CP protocol stack when non-3GPP access is used between the evolved ProSe remote UE and the evolved ProSe UE-to-network relay UE are illustrated in FIGS. 10(a) and 10(b), respectively.

Traffic of one or multiple evolved ProSe remote UEs may be mapped to a single data radio bearer (DRB) of a Uu interface of an evolved ProSe UE-to-network relay UE. Multiple Uu DRBs may be used to carry traffic of different quality of service (QoS) classes, for one or multiple evolved ProSe remote UEs. It is also possible to multiplex traffic of the evolved ProSe UE-to-network relay UE itself onto the Uu DRB, which is used to relay traffic to/from evolved ProSe remote UEs. How traffic is mapped between sidelink bearers and Uu bearers is up to eNB implementation and the mapping is configured for the evolved ProSe UE-to-network relay UE by the eNB. An adaptation layer over Uu is supported to identify the evolved ProSe remote UE/evolved ProSe UE-to-network relay UE and their correspondence.

Within a Uu DRB, different evolved ProSe remote UEs and different bearers are indicated by additional information included in an adaptation layer header added to a PDCP PDU. Details of this additional information are yet to be discussed. An adaptation layer is supported over non-3GPP access for a short-range link between the evolved ProSe remote UE and the evolved ProSe UE-to-network relay UE. An adaptation layer header is added to a PDCP PDU.

According to TR 23.733v0.2.0, the following architecture assumption is defined based on the above CP stack and UP stack, as illustrated in Table 3 below.

TABLE 3

The following architecture assumptions are made for this study item:
The eRelay-UE is a Layer 2 relay.

TABLE 3-continued

The NAS signaling from the eRemote-UE is sent to MME using an Indirect 3GPP Communication via an eRelay-UE. On the eNB, each eRemote-UE has an associated S1-MME interface.
The PC5 user plane and LTE-Un user plane of eRelay-UE are used to transport user data between eRemote-UE and core network.

NOTE:
The user plane and control plane protocol stack of layer 2 relay is documented in TR 36.746 [3].

Figure 11:
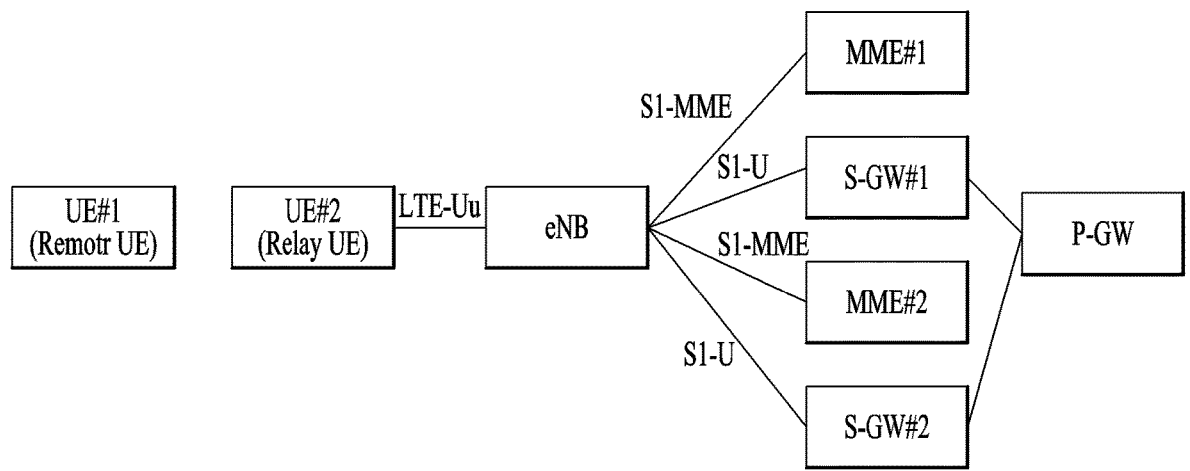
FIG. 11 is an exemplary diagram illustrating the relationship between remote and relay user equipments (UEs) and each network node.

FIG. 11 illustrates the relationship between remote and relay UEs and each network node. Referring to FIG. 11, for Layer-2 relay, a serving MME (i.e., MME #1) exists for a remote UE, UE #1, and a serving MME (i.e., MME #2) exists for a relay UE, UE #2. That is, there are S1-MMEs for the UEs and the S1-MMEs may be identical. The same thing applies to the UP. For user traffic routing for the remote UE, UE #1, an S-GW (i.e., S-GW #1) exists, and for user traffic routing for the relay UE, UE #2, an S-GW (i.e., S-GW #2) exists. That is, S1-U is required for each UE and the S-GWs may be identical. While only one P-GW is shown in FIG. 11, for the convenience, a PDN connection may be established by connecting each S-GW to a different P-GW. Further, while the relay UE and the remote UE are shown as served by the same eNB in FIG. 11, the relay UE and the remote UE may be served by different eNBs.

Upon receipt of a network connection request (an RRC message, a NAS message, a PC5-S message, or user traffic traffic) from a remote UE, an idle-mode relay UE should transmit the request to a network by transitioning to connected mode. The connection request of the remote UE may be interpreted as triggering the relay UE to transmit a CP message or a UP message/data related to the remote UE to the network. This interpretation of the connection request applies throughout the present disclosure.

With reference made again to FIG. 11, after the relay UE establishes an RRC connection with an eNB to transmit the network connection request of the remote UE to the network, the relay UE transmits the connection request to the eNB. For a CP message, the eNB transmits the connection request to MME #1, whereas for a UP message/data, the eNB transmits the connection request to S-GW #1. For this purpose, it is assumed that a process of configuring S1-MME for the remote UE, UE #1 on the link between the eNB and MME #1 and/or a process of configuring S1-U for UE #1 on the link between the eNB and S-GW #1 is performed.

However, even though the relay UE, UE #2 is in the RRC connected state, S1-MME (i.e., the link between the eNB and MME #2) and S1-U (i.e., the link between the eNB and S-GW #2) have not been configured for UE #2. That is, a mismatch between RRC mode and core network (CN) mode occurs to the relay UE (i.e., although the relay UE is RRC connected, the relay UE is in a CN idle state). When DL traffic is directed to the relay UE, the S-GW transmits a Downlink Data Notification (DDN) message to the MME in order to request paging, and the MME transmits a paging message to the UE via the eNB. However, once the UE is RRC connected, the UE does not check/monitor paging any longer. Therefore, the remote UE, which is CN idle but RRC connected, does not respond to the paging, and the MME considers the absence of the paging response from the UE to be paging failure. As a result, the DL traffic may not be delivered to the relay UE. In this context, various embodiments of the present disclosure provide the following methods to avert this problem.

Embodiment 1

Upon receipt of a paging message directed to a second UE (relay UE) from a second MME, when the second UE is at once CN-idle and RRC-connected, an eNB may transmit a message (e.g., a paging response message) including information related to the connection state of the second UE to the second MME in response to the paging message. The second UE may have transitioned to the RRC connected state because of reception of a network connection request from a first UE (remote UE), and the information related to the connection state of the second UE may include information indicating that the eNB is serving the second UE or information indicating that the second UE is in the RRC connected state. Upon receipt of the message including the information related to the connection state of the second UE, the second MME may configure a user plane for the second UE.

Conventionally, when an eNB receives a paging message for a specific UE, the eNB transmits the paging message to the UE. However, because the relay UE which has not established a UP connection for the remote UE (i.e., CN idle) is in the RRC connected state as described above, the relay UE fails to respond to the paging message transmitted by the eNB. In this case, the paging is considered to be failed and thus traffic is not delivered to the relay UE. Therefore, upon receipt of a paging request for the relay UE which has established an RRC connection for the remote UE, the eNB transmits information about the connection state of the relay UE to a network node, instead of simply performing paging for the relay UE, so that the network node may configure a user plane for the relay UE. Accordingly, traffic may be delivered successfully to the relay UE.

Figure 12:
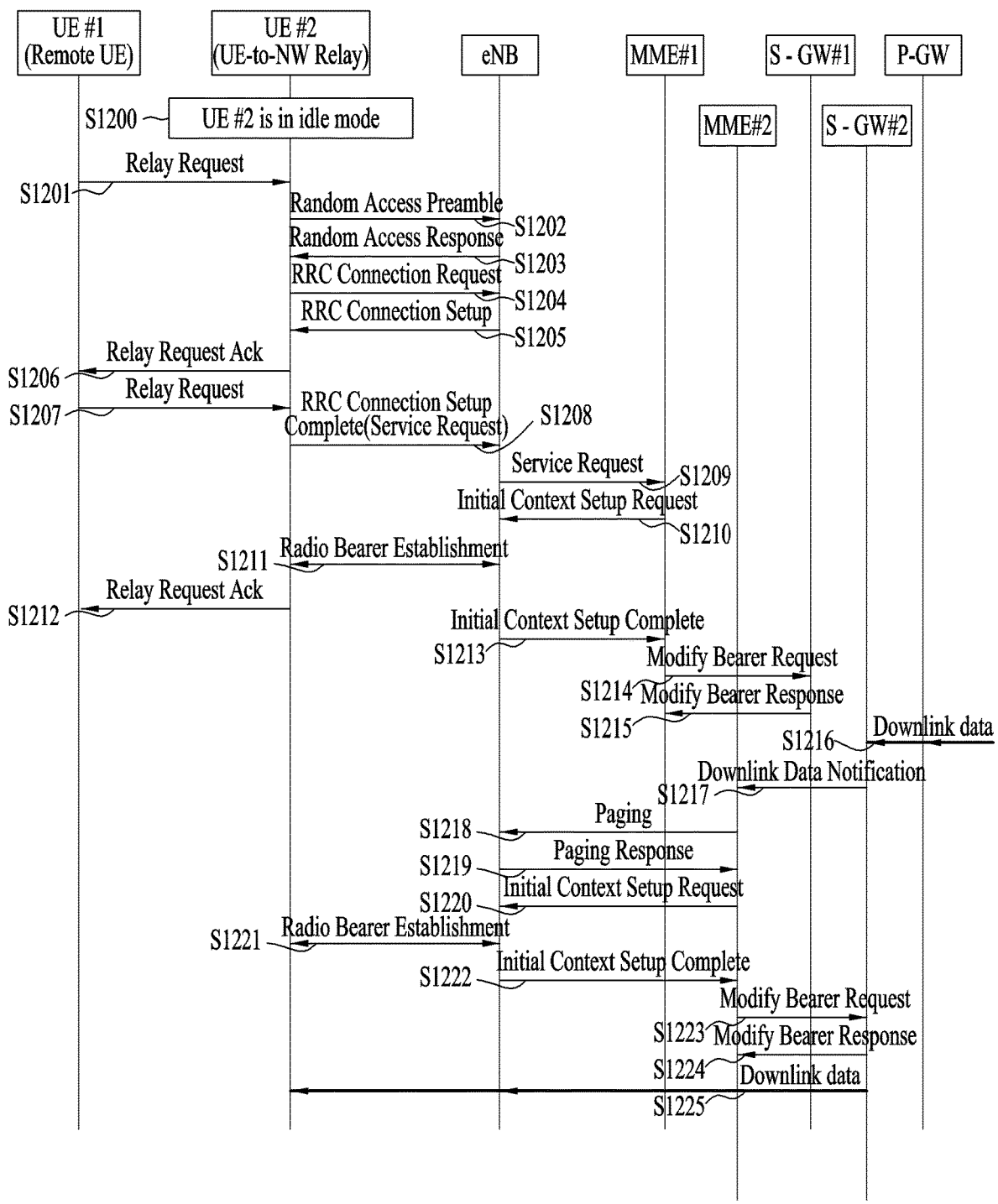
FIGS. 12, 13, 14, and 15 are diagrams illustrating embodiments of the present disclosure.

With reference to FIG. 12, the above embodiment will be described from the perspective of signaling from each network node. Referring to FIG. 12, a second UE (UE #2) which is a relay UE is in idle mode in step S1200. In step S1201, a first UE (UE #1) which is a remote UE transmits a network connection request to the relay UE, UE #2. FIG. 12 is based on the assumption that the remote UE transmits a message requesting relay of UL traffic to the network, for example, a Relay Request message to the relay UE. The message may include an RRC Connection Request message generated from the AS layer of the remote UE, UE #1. The message may explicitly or implicitly indicate inclusion of the RRC message.

The relay UE performs a random access procedure according to the network connection request (relay request) of the remote UE. Specifically, the relay UE, UE #2 transmits a Random Access Preamble to an eNB in step S1202. In step S1203, the eNB replies to the relay UE, UE #2 with a Random Access Response. The relay UE, UE #2 transmits an RRC Connection Request message to the eNB in step S1204. The RRC Connection Request message may be generated by the AS layer of the remote UE, UE #1 or the relay UE, UE #2 (the RRC Connection Request message may then include information indicating that this message is for the remote UE, UE #1), or may be generated by the remote UE, UE #1 and modified/processed by the relay UE, UE #2 (the RRC Connection Request message may then include information indicating that this message is relayed by the relay UE, UE #2). In step S1205, the eNB replies to the relay UE, UE #2 with an RRC Connection Setup message. The relay UE, UE #2 transitions to connected mode. The connected mode may mean RRC connected mode or connected mode of an LTE-Uu link.

In step S1206, the relay UE, UE #2 replies to the remote UE, UE #1 with a Relay Request Ack message. The Relay Request Ack message may indicate to the remote UE, UE #1 that the relay UE, UE #2 has established an RRC connection, has transitioned to the connected mode, or has established a signaling radio bearer with the network. The Relay Request Ack message may include the RRC Connection Setup message as received from the eNB or as modified/processed.

In step S1207, the remote UE, UE #1 transmits, to the relay UE, UE #2, a message requesting relay of UL traffic to the network, for example, a Relay Request message. The message may include a Service Request message generated by the NAS layer of the remote UE, UE #1. The message may then indicate explicitly or implicitly inclusion of the NAS message. Alternatively, the message may include an RRC Connection Setup Complete message which is an AS-layer message including a Service Request message generated by the NAS layer of the remote UE, UE #1. The message may then indicate explicitly or implicitly indicate inclusion of the NAS message, or inclusion of the AS message including the NAS message. The NAS message generated by the NAS layer of the remote UE, UE #1 may be any of various existing or newly defined NAS messages, not limited to the Service Request message. The same thing applies throughout the present disclosure. Steps S1206 and S1207 may be skipped. In this case, the NAS message generated from the remote UE, UE #1 may be provided to the relay UE, UE #2 in step S1201.

Successively in step S1208, the relay UE, UE #2 transmits an RRC Connection Setup Complete message to the eNB. The RRC Connection Setup Complete message may be generated by the AS layer of the remote UE, UE #1 or the relay UE, UE #2 (the RRC Connection Setup Complete message may then include information indicating that this message is for the remote UE, UE #1), or may be generated by the remote UE, UE #1 and then modified/processed by the relay UE, UE #2 (the RRC Connection Setup Complete message may include information indicating that this message is relayed by the relay UE, UE #2).

The RRC Connection Setup Complete message includes a Service Request message. The Service Request message may be generated by the NAS layer of the remote UE, UE #1 or the relay UE, UE #2 (information indicating that this message is for the remote UE (UE #1) can be included), or may be generated by the remote UE, UE #1 and modified/processed by the relay UE, UE #2 (this message is relayed by the relay UE (UE #2) can be included).

While the Service Request message has been mentioned as a NAS message that the relay UE, UE #2 transmits to the eNB, the NAS message may be any of various existing or newly defined NAS messages, not limited to the Service Request message.

In step S1209, the eNB transmits the Service Request message to the serving MME, MME #1 of the remote UE, UE #1. Upon receipt of the Service Request message, MME #1 transmits an Initial Context Setup Request message to the eNB in step S1210. In step S1211, the eNB and the relay UE, UE #2 set up a user plane radio bearer (i.e., a DRB). The setup may be intended mainly to provide a network connection service to the remote UE, UE #1. In step S1212, the relay UE, UE #2 replies to the remote UE, UE #1 with a Relay Request Ack message. The Relay Request Ack message may indicate to the remote UE, UE #1 that the relay UE, UE #2 has established a user plane radio bearer (i.e., DRB) or has prepared for relaying user traffic of the remote UE, UE #1. The message may include QoS information related to the DRB and/or the PC5 user plane. The remote UE, UE #1 may transmit a UP message/data or a CP message to the relay UE, UE #2. The relay UE, UE #2 transmits the received message/data to the network.

The UP message/data transmitted by the remote UE, UE #1 is transmitted to the eNB and S-GW #1 via the relay UE, UE #2. The CP message transmitted by the remote UE, UE #1 is transmitted to the eNB and MME #1 via the relay UE, UE #2.

The eNB and MME #1 operate according to a Service Request procedure in steps S1213 to S1215. Details of the operations of the eNB and MME #1 are pursuant to clause 5.3.4.1 (UE triggered Service Request) of TS 23.401. For legacy operations which have not been described herein, also refer to TS 23.401 and TS 36.331.

In step S1216, DL traffic is directed to the relay UE, UE #2 and S-GW #2 receives the DL traffic. S-GW #2 does not have a user plane (i.e., S1-U) to the relay UE, UE #2, and thus transmits a Downlink Data Notification message requesting paging to MME #2 in step S1217. The operations are based on legacy operations described in TS 23.401.

In step S1218, MME #2 transmits a Paging message to eNB(s) in order to page the relay UE, UE #2. This operation is based on a legacy operation described in TS 23.401.

In step S1219, the eNB may transmit a message including information related to the connection state of the second UE (e.g., a paging response message), UE #2 to the second MME, MME #2 in response to the Paging message. That is, the eNB serving the relay UE, UE #2 which is (CN idle and) RRC connected transmits, to MME #2, a message indicating that the eNB is serving the relay UE, UE #2 and/or the relay UE, UE #2 is in the RRC connected mode. For example, the eNB transmits a Paging Response message which may be a legacy S1-AP message or a newly defined message. Upon receipt of the response from the eNB, MME #2 discontinues the paging transmission.

Subsequently, MME #2 establishes the user plane for the relay UE in steps S1220 to S1224. In step S1225, S-GW #2 transmits DL traffic to the relay UE, UE #2 via the eNB.

In another method, the eNB may indicate to the relay UE, UE #2 by dedicated RRC signaling that a paging request has been received and/or DL traffic is directed to the relay UE, UE #2 and/or a Service Request procedure to the network is needed, instead of replying to MME #2 as in step S1219. Upon receipt of the indication, the relay UE, UE #2 may perform the Service Request procedure to MME #2. In this manner, a user plane generation procedure may be performed in steps S1202 to S1224.

Embodiment 2

Figure 13:
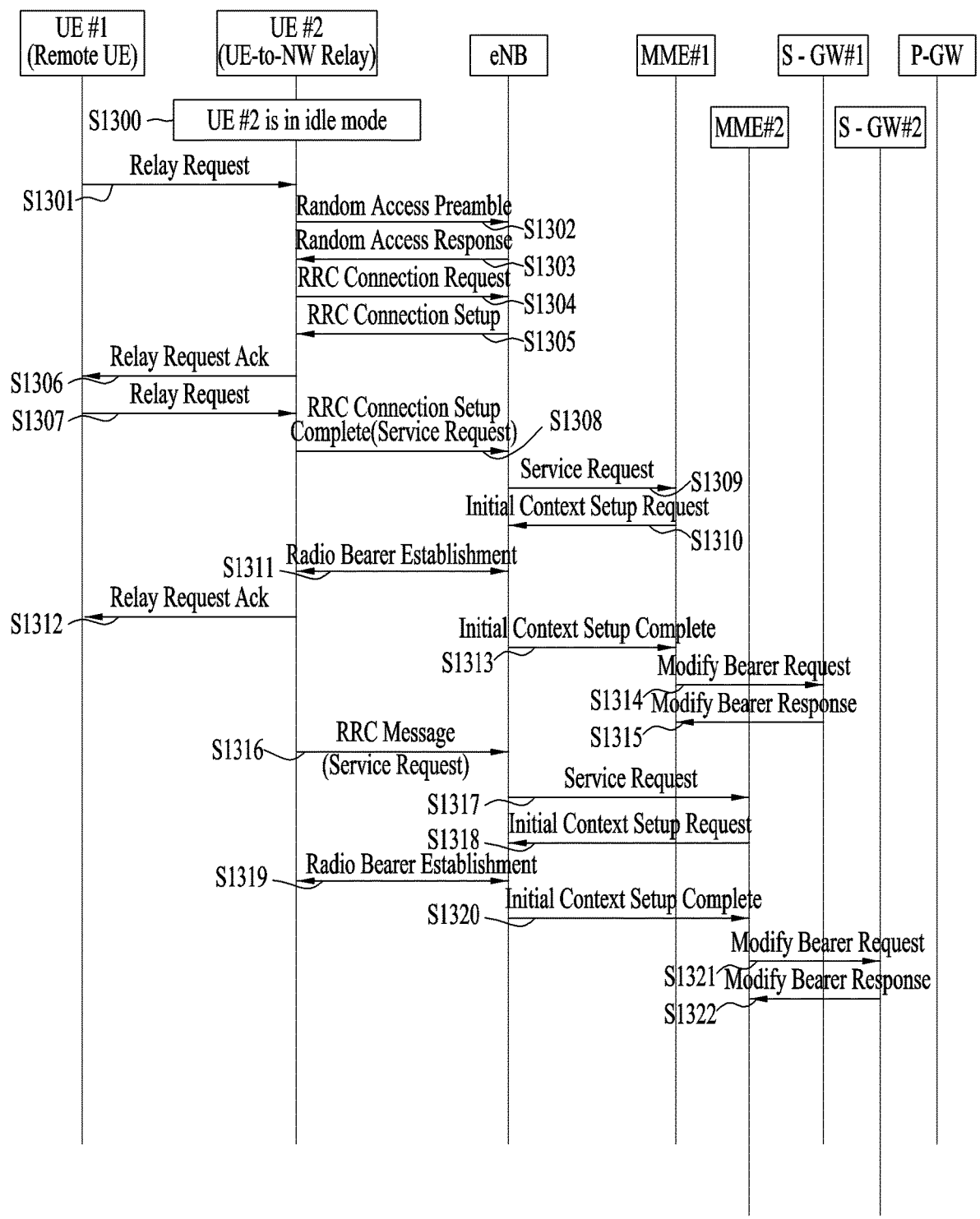

Another embodiment provides a method of transmitting information indicating the connection state (e.g., RRC connected) of a relay UE to a serving MME by the relay UE. The method will be described in detail with reference to FIG. 13.

A description of steps S1301 to S1315 is replaced with the description of steps S1201 to S1215 of Embodiment 1.

In step S1316, the relay UE, UE #2 transmits, to its serving MME, MME #2, a message indicating that the relay UE, UE #2 is in connected mode (e.g., RRC connected mode), for example, a Service Request message. The message may be transmitted in a legacy RRC message or a newly defined RRC message. The Service Request message may include information indicating that the relay UE, UE #2 is in the connected mode to service a remote UE and/or information indicating that S1-U generation has not been requested and/or user plane generation has not been requested and/or only S1-MME generation has been requested. A NAS message transmitted from the relay UE, UE #2 to the MME does not need to be necessarily the Service Request message. The NAS message may be any of various legacy NAS messages (e.g., Extended Service Request) or newly defined NAS messages.

Step S1316 may be performed at any time after the relay UE, UE #2 is placed in the RRC connected mode. Alternatively, when the relay UE, UE #2 performs step S1308, the relay UE, UE #2 may also transmit the NAS message in the RRC Connection Setup Complete message to the serving MME.

In step S1317, the eNB transmits the received NAS message to the serving MME, MME #2 of the relay UE, UE #2. MME #2 sets the connection management (CM) state of the relay UE, UE #2 to connected mode. The CM state may mean an EPS connection management (ECM) state.

Steps S1318 to S1322 are performed for MME #2 to establish a user plane for the relay UE, UE #2. That is, an S1-U link is established for the relay UE, UE #2, and when there is a DRB to be established in addition to the DRB established in step S1311, the DRB is established. For details, refer to clause 5.3.4.1 (UE triggered Service Request) in TS 23.401. However, the difference lies in that the eNB determines whether it is necessary to establish another DRB in addition to an existing DRB and establishes the DRB based on the determination.

The steps of establishing a user plane for the relay UE, UE #2 may be optional. MME #2 may skip these steps based on various pieces of information (e.g., information indicating that there is no need for generating S1-U or a user plane or information indicating that the relay UE, UE #2 is in the connected mode to service the remote UE) included in the NAS message received in step S1317.

When the steps of establishing a user plane are not performed, DL traffic is directed to the relay UE, UE #2, and thus MME #2 receives a Downlink Data Notification message from S-GW #2, MME #2 performs a step of establishing a user plane for the relay UE, UE #2 immediately without paging the relay UE, UE #2 (a step equivalent to steps S1318 to S1322).

If the user plane has been established, the DL traffic directed to the relay UE, UE #2 may be transmitted to the relay UE, UE #2 via the eNB by S-GW #2 as is done conventionally.

Embodiment 3

This embodiment provides a method of indicating to a serving MME of a relay UE that a remote UE has been RRC connected by a serving MME of the remote UE. That is, the method is intended to prevent failure of paging for the relay UE by message exchange between the MMEs.

Figure 14:
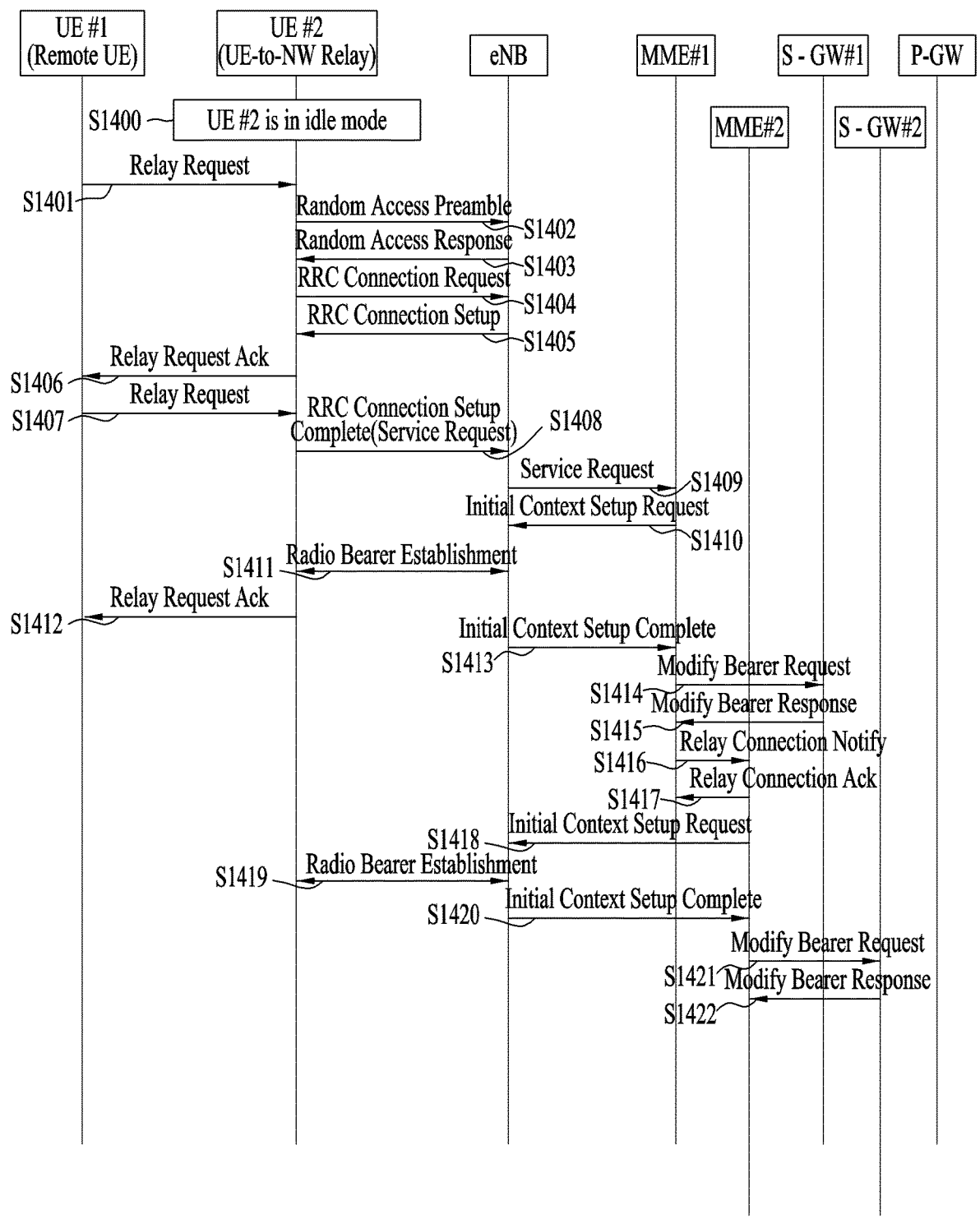

FIG. 14 illustrates a detailed procedure that implements Embodiment 3. A description of steps S1401 to S1415 is replaced with the description of steps S1201 to S1215 of Embodiment 1.

In step S1416, as UE #1 acting as a remote UE transitions to the connected mode, MME #1 transmits a message indicating that the remote UE, UE #1 is in the connected mode to the serving MME of UE #2 acting as a relay UE. The message is shown as a Relay Connection Notify message in FIG. 14. This message may be a legacy GTP-C message or a newly defined message.

The message may include information indicating that the remote UE served by the relay UE, U #2 is in the connected mode and/or information indicating that the Relay UE, UE #2 is in the RRC connected mode, and/or information indicating that the CM state of the relay UE, UE #2 should be set to connected. As messages transmitted in steps S1418 and S1419 include information/an indication instructing transmission of the Relay Connection Notify message from MME #1 to MME #2, this message may be transmitted.

MME #1 may be aware that UE #1 served by MME #1 acts as a remote UE, a relay UE for the remote UE is UE #2, and the serving MME of UE #2 is MME #2, when or after the remote UE and the relay UE have established a relay-remote relationship, when or after the remote UE and the relay UE have established a one-to-one direct link, or by messages including information to this effect, transmitted in steps S1418 and S1419.

While different MMEs are shown as serving the remote UE and the relay UE in FIG. 14, the same MME may serve the two UEs. In this case, the MME may internally process this. Step S1416 may be performed at any time after step S1419.

In step S1417, MME #2 transmits a Relay Connection Ack message as a response to MME #1. This step may be optional.

Step S1418 to S1422 are considered to be identical to or an extension of steps S1318 to S1322 of Embodiment 1. For example, various pieces of information included by the relay UE UE #2 may be generated and included by MME #1.

Embodiment 4

According to a fourth embodiment, an eNB indicates a relay connection to an MME such that an S1-U interface may be established. The operation will be described with reference to FIG. 15. A description of steps S1501 to S1515 in FIG. 15 is replaced with the description of steps S1201 to S1215 of Embodiment 1.

In step S1516, as UE #1 acting as a remote UE is in the connected mode, the eNB transmits a message that UE #1 is in the connected mode to the serving MME of UE #2 as a relay UE serving UE #1. In FIG. 15, the message is shown as a Relay Connection Notify message. This message may be a legacy S1-AP message or a newly defined message. The message may include information indicating that the remote UE served by the relay UE, U #2 is in the connected mode and/or information indicating that the Relay UE, UE #2 is in the RRC connected mode, and/or information indicating that the CM state of the relay UE, UE #2 should be set to connected. As a message transmitted in step S1518 includes information/an indication instructing transmission of the Relay Connection Notify message from the eNB to MME #2, this message may be transmitted.

The eNB may be aware that UE #1 served by the eNB acts as a remote UE, a relay UE for the remote UE is UE #2, and the serving MME of UE #2 is MME #2, when or after the remote UE and the relay UE have established the relay-remote relationship, when or after the remote UE and the relay UE have established a one-to-one direct link, or by a message including information to this effect, transmitted in step S1512 and/or step S1514 and/or step S1518.

Figure 15:
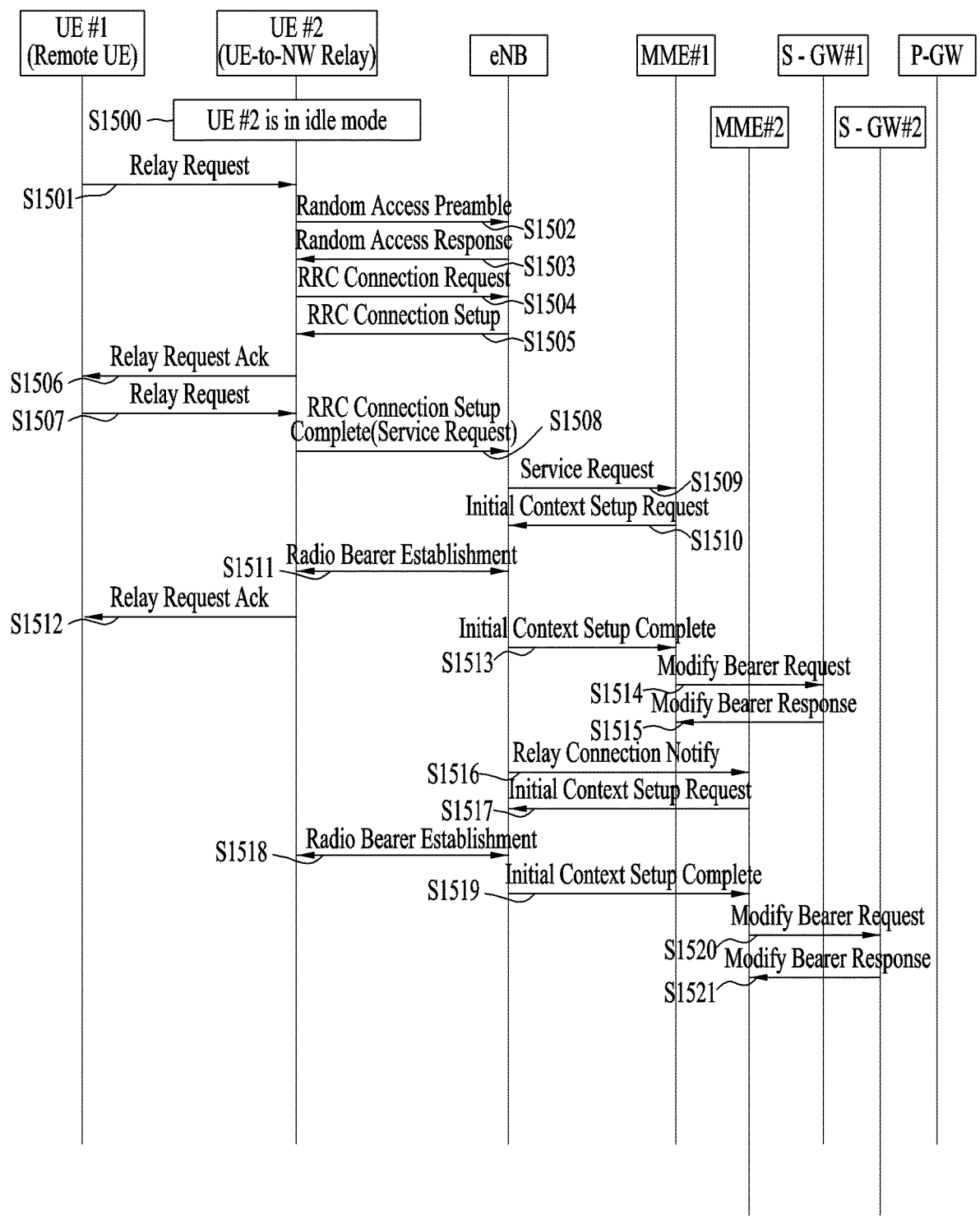

While different MMEs are shown as serving the remote UE and the relay UE in FIG. 15, the same MME may serve the two UEs. In this case, the MME may internally process this. Step S1516 may be performed at any time after step S1519.

Step S1517 to S1521 are considered to be identical to or an extension of steps S1218 to S1222 of Embodiment 1. For example, various pieces of information included by the relay UE UE #2 may be generated and included by MME #1.

Figure 16:
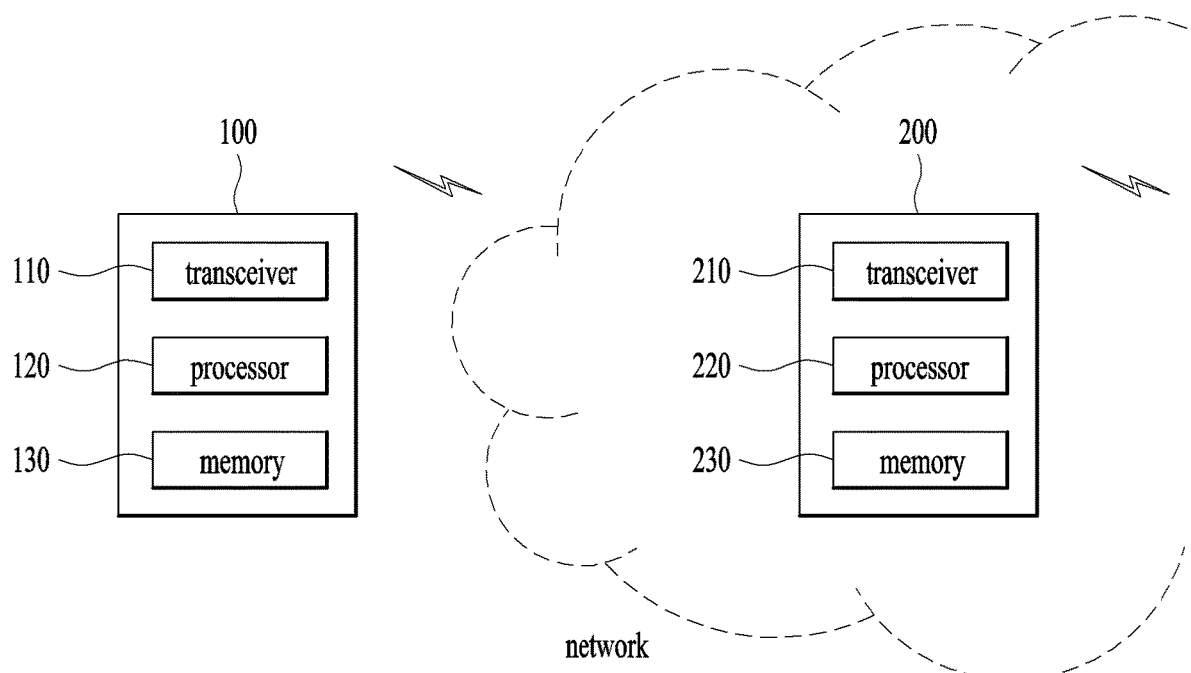
FIG. 16 is a block diagram of a node device according to an embodiment of the present disclosure.

FIG. 16 is a block diagram of a preferred embodiment of a UE and a network node according to an example of the present disclosure.

Referring to FIG. 16, a UE 100 according to the present disclosure may include a transceiver 110, a processor 120, a memory 130. The transceiver 110 may transmit and receive various signals, data, and information to and from an external device. The UE 100 may be connected to the external device wiredly and/or wirelessly. The processor 120 may provide overall control to the UE 100, and may be configured to compute and process information to be transmitted to the external device or information received from the external device by the UE 100. The memory 130 may store the computed and processed information for a predetermined time, and may be replaced by a component such as a buffer (not shown). Further, the processor 120 may be configured to perform a UE operation proposed by the present disclosure.

Referring to FIG. 16, a network node 200 according to the present disclosure may include a transceiver 210, a processor 220, a memory 230. The transceiver 210 may transmit and receive various signals, data, and information to and from an external device. The network node 200 may be connected to the external device wiredly and/or wirelessly. The processor 220 may provide overall control to the network node 200 and may be configured to compute and process information to be transmitted to the external device or information received from the external device by the network node 200. The memory 230 may store the computed and processed information for a predetermined time, and may be replaced by a component such as a buffer (not shown). Further, the processor 220 may be configured to perform a network node operation proposed by the present disclosure. Specifically, the processor 220 receives a paging message for a second UE from a second MME, and when the second UE is in both of a CN idle state and an RRC connected state, may transmit a message including information related to the connection state of the second UE to the second MME in response to the paging message.

The specific configurations of the UE 100 and the network device 200 may be implemented such that the details described in the various embodiments of the present disclosure may be applied independently or implemented such that two or more of the embodiments are applied at the same time. For clarity, a redundant description is omitted.

The embodiments of the present disclosure may be implemented through various means, for example, hardware, firmware, software, or a combination thereof.

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

While various embodiments of the present disclosure have been described above in the context of a 3GPP system, the embodiments are applicable in the same manner to various mobile communication systems.

The invention claimed is:

1. A method of performing a paging-related operation by a base station of a second user equipment (UE) having a connection to a first UE in a wireless communication system, the method comprising:
   receiving a paging message for the second UE from a second mobility management entity (MME) by the base station; and
   based on that the second UE is in both of a core network (CN) idle state and a radio resource control (RRC) connected state, transmitting, by the base station to the second MME, a message including information related to a connection state of the second UE in response to the paging message, although a response to the paging message is not received from the second UE while the second UE is in the CN idle state and the RRC connected state.

2. The method according to claim 1, wherein the RRC connected state is a state to which the second UE has transitioned in response to reception of a network connection request from the first UE.

3. The method according to claim 1, wherein the information related to the connection state of the second UE includes information indicating that the base station is serving the second UE or information indicating that the second UE is in the RRC connected state.

4. The method according to claim 1, wherein the message including the information related to the connection state of the second UE is a paging response message.

5. The method according to claim 1, wherein upon receipt of the message including the information related to the connection state of the second UE, the second MME establishes a user plane for the second UE.

6. The method according to claim 1, wherein when the second UE is in both of the CN idle state and an RRC idle state, the base station transmits a paging message for the second UE.

7. The method according to claim 1, wherein the first UE is a remote UE and the second UE is a relay UE.

8. A base station for performing an operation related to paging of a second user equipment (UE) having a connection to a first UE in a wireless communication system, the base station comprising:
   a transceiver; and
   a processor,
   wherein the processor is configured to:
   receive a paging message for the second UE from a second mobility management entity (MME); and based on that the second UE is in both of a core network (CN) idle state and a radio resource control (RRC) connected state, transmit, to the second MME, a message including information related to a connection state of the second UE in response to the paging message, although a response to the paging message is not received from the second UE while the second UE is in the CN idle state and the RRC connected state.

9. The base station according to claim 8, wherein the RRC connected state is a state to which the second UE has transitioned in response to reception of a network connection request from the first UE.

10. The base station according to claim 8, wherein the information related to the connection state of the second UE includes information indicating that the base station is serving the second UE or information indicating that the second UE is in the RRC connected state.

11. The base station according to claim 8, wherein the message including the information related to the connection state of the second UE is a paging response message.

12. The base station according to claim 8, wherein upon receipt of the message including the information related to the connection state of the second UE, the second MME establishes a user plane for the second UE.

13. The base station according to claim 8, wherein when the second UE is in both of the CN idle state and an RRC idle state, the base station transmits a paging message for the second UE.

14. The base station according to claim 8, wherein the first UE is a remote UE and the second UE is a relay UE.

\* \* \* \* \*